W. D. JAMES.
GUARD FOR PIGS.
APPLICATION FILED JUNE 12, 1916.
1,307,862.
Patented June 24, 1919.
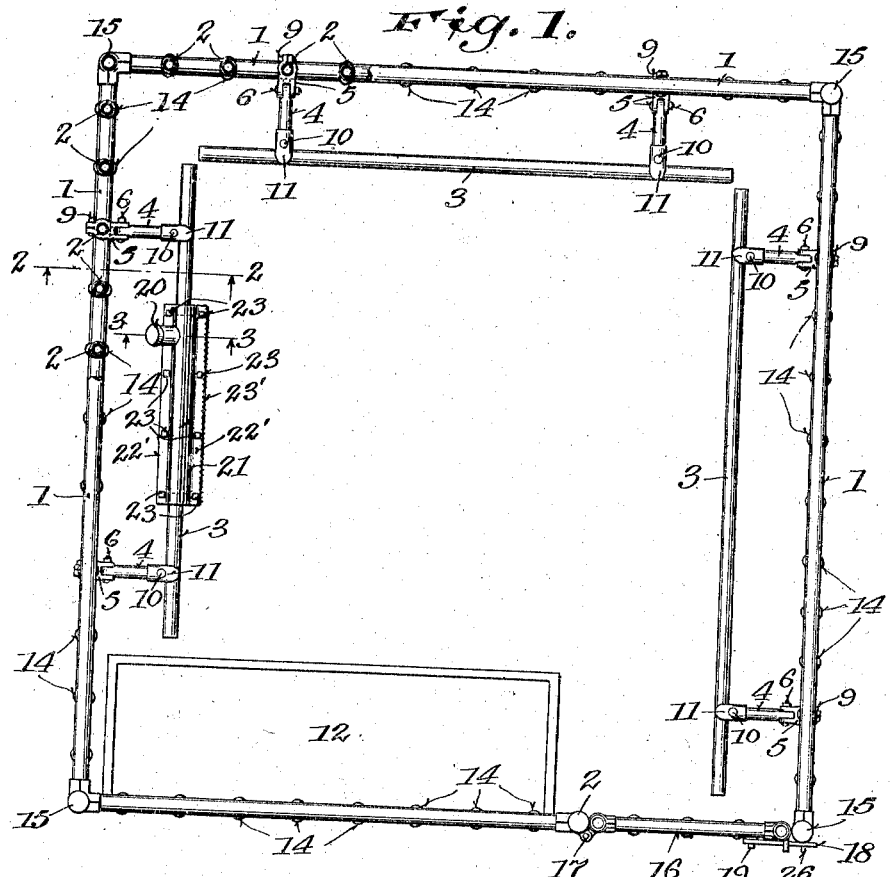
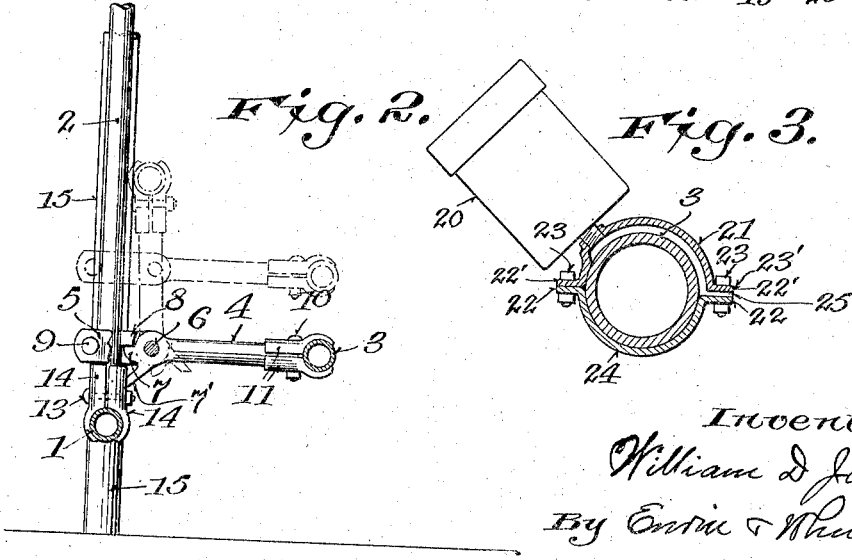
Inventor
William D James
By Ervin & Wheeler
Attorneys.

UNITED STATES PATENT OFFICE.

WILLIAM D. JAMES, OF FORT ATKINSON, WISCONSIN, ASSIGNOR TO JAMES MANUFACTURING COMPANY, OF FORT ATKINSON, WISCONSIN, A CORPORATION OF WISCONSIN.

GUARD FOR PIGS.

1,307,862.  Specification of Letters Patent.  Patented June 24, 1919.

Application filed June 12, 1916. Serial No. 103,073.

*To all whom it may concern:*

Be it known that I, WILLIAM D. JAMES, a citizen of the United States, residing at the city of Fort Atkinson, county of Jefferson, and State of Wisconsin, have invented new and useful Improvements in Guards for Pigs, of which the following is a specification.

My invention relates to improvements in guards for shielding pigs when small from being crushed or injured by being laid upon by the mother or other swine. It also pertains to a scratching and greasing attachment for such guards.

The object of my improvement is to provide a simple and efficient shield which may be thrown back against its supporting wall when not in use, and which may be readily brought to its normal position for shielding young pigs when required, said guard being also adapted to serve as a bearing against which animals may scratch themselves, and also as a support for a grease receptacle.

My invention is further explained by reference to the accompanying drawings, in which—

Figure 1 represents a plan view thereof.

Fig. 2 represents a side view of a portion of one corner of an inclosure provided with my improved shield, drawn on line 2, 2 of Fig. 1, and Fig. 3 is a vertical section of one of the guards provided with a grease retaining member.

Like parts are identified by the same reference numerals throughout the several views.

While my shield is adapted to be used with pens formed of boards or any other similar construction, the same is herein shown as connected with a pen formed of hollow tubing comprising a plurality of side members 1 and a plurality of vertical members 2, which side and vertical members are connected together by coupling joints in the ordinary manner. My invention consists, more especially, in the horizontal members 3 which are pivotally connected with the side members 1 by a plurality of members 4 and 5, said members 4 and 5 being pivotally connected together by the pivotal bolts 6, which bolts 6 extend through the contiguous ends of said members 4 and 5, whereby the horizontal bars 3 and 4 may be turned upwardly, as shown in Fig. 2, from the position shown in said figure by the full lines to that indicated by dotted lines. The member 4 is provided with a stop lug 7, while the member 6 is provided with an opposing lug 8, whereby when said member 3 is brought to the lower position, indicated in Fig. 2, the lug 7 is brought in contact with the lug 8, whereby said members 3 and 4 are retained in the position indicated in said Fig. 2. If desired, the lugs 7 and 8 may be dispensed with and the members 7' substituted therefor, in which case the members 7' are adapted as said members 4 are brought to a horizontal position to contact with the clamping members 14, when said members 7' serve as a brace to support said members 4, as shown in Fig. 2. Both lugs 7 and 7' may be used if desired. 20 is a grease retaining receptacle. While the receptacle 20 is referred to as a grease receptacle it is obvious that any other antiseptic substance or insecticide may be used, the term grease being employed generically for the reason that grease is most commonly used, either alone, or as a base for a more active ingredient.

The receptacle 20 is preferably arranged to discharge into a cavity formed by securing the curved member 21 to the side of the tubular member 3, this cavity constituting an extension of the reservoir for grease, of which receptacle 20 is a part. If desired, receptacle 20 may be omitted where the cavity formed by member 21 can be conveniently made large enough to hold the desired quantity of grease. The member 21 is preferably associated with a coöperating clamping member 24, these members 21 and 24 being provided with clamping flanges 22' and 22, respectively, through which clamping bolts 23 are passed as shown in Fig. 3. The inner edges of the clamping members 22' are preferably serrated at 23' to increase the scratching effect when the body of the animal is brought in rubbing contact therewith.

One or more apertures or slots 25 are provided between the flanges 22 and 22' through which the contents of the reservoir, provided by member 21 and 20 respectively, may escape upon the animal when such animal presses its body against the flanges 22 and 22'. The materials of which the members 3, 21 and 24 are formed are preferably adapted to yield under pressure of the body of the animal to facilitate an expulsion of the contents through the openings between the flanges 22 and 22'. If desired, the mixture may be of such consistency that it will exude to some extent under normal stable temperatures, at least when the rod 3 is being vibrated under the pressure of the body of the animal.

When the inclosure is made of tubing, as shown, the members 5 are secured to the vertical members 2 by a plurality of clamping bolts 9, while the members 4 are secured to the horizontal members 3 by a plurality of clamping bolts 10 and clamping members 11. 12 is a food receptacle of ordinary construction and need not be herein further explained.

The vertical members 2 are secured to the horizontal members 1 by a plurality of clamping bolts 13 and a plurality of clamping members 14. The pen is preferably supported at its respective corners from the floor or ground by a plurality of vertical members 15.

16 is a door which is pivotally connected near its respective upper and lower ends to one of the vertical standards 2 by hinges 17, in the ordinary manner. 18 is a latch which is pivotally connected to the door 16 by the bolt 19, and the same is adapted when closed to engage the catch 26.

Considerable importance is attached to the fact that the supporting arms for the guard rods are in a substantially horizontal position when the guards are in use, for the reason that when the young pigs become large enough so that their shoulders or backs strike the guards as the pigs attempt to pass under them, these guards freely yield in an upward direction without injuring the pigs. It frequently happens that the pigs run under the guards rapidly to escape a stronger pig of their own number, or to escape the mother when she is about to lie down. In such cases, the momentum of the young pig is such that its back is likely to be injured upon forcibly striking an unyielding guard. Therefore, a great advantage is secured by providing a guard which is adapted to yield freely under such circumstances.

Having thus described my invention what I claim as new and desire to secure by Letters Patent, is—

1. In a device of the described class, the combination with the walls of an inclosure, of a horizontally extending guard supported from one of said walls, and rigidly held thereby against downward movement from a normal pig protecting position, substantially in the plane of its connection with the wall, said member having hinged connection with the inclosure, adapted to permit it to swing upwardly from said normal position to a raised position against the wall of the inclosure.

2. In a pig pen provided with vertical wall posts, the combination of a set of brackets secured to said posts, guard supporting arms pivotally connected with said brackets, said arms and brackets being provided with mutually engaging stops adapted to prevent the arms from swinging downwardly from a substantially horizontal guard supporting position, while allowing them to freely swing upwardly from such position, and a guard connecting the outer ends of said arms, and supported thereby in pig protecting position when the stops are in engagement with each other.

3. In a pig pen, the combination with the walls thereof, of a horizontally extending guard having one way hinge connection with one of the walls, and supported thereby normally in a position sufficiently above the floor to allow small pigs to pass beneath it, said one way hinge connection being adapted to allow said guard to be lifted to a raised position against the wall of the inclosure when not in use; said guard and its supports being adapted to provide a free and unobstructed runway for small pigs underneath the guard when the latter is in position for use.

4. In a pig pen, the combination with the walls thereof, of a horizontally extending guard having one way hinge connection with one of the walls, and supported thereby normally in a position sufficiently above the floor to allow small pigs to pass beneath it, said one way connection being adapted to allow said guard to be lifted to a raised position against the wall of the inclosure when not in use, and braces connected with the guard supporting means, and adapted to bear upon the wall of the receptacle when the guard is in normal pig protecting position, whereby strains upon the hinge connections may be relieved, and whereby the guard may be supported without obstructing the space beneath it.

5. In a pig pen, the combination with the walls thereof, of a horizontally extending pig protecting guard, and a member extending along the guard and having a portion intermediate of its margins spaced therefrom, the space between the guard and the member adapted to constitute a reservoir for grease and disinfectants, the front margin of said member being slightly spaced from the guard to permit a slow escape of the contents of said space along said margin.

6. In a pig pen, the combination with the walls thereof, of a horizontally extending pig protecting guard, and a member clamped thereto, and having a portion intermediate of its margins spaced therefrom, and adapted to constitute a reservoir for grease and disinfectants; the front margin of said member being formed to permit a slow escape of the contents of said space along said margin, said margin being roughened and adapted to serve as a scratching surface for use by the animals confined in said pen, whereby a discharge of grease along the front portion of the guard may be facilitated.

7. In a pig pen, the combination with the walls thereof, of a horizontally extending pig protecting guard, supporting arms therefor having one way hinge connection with a wall of the pen, a grease reservoir mounted on said member provided with apertures adapted to permit a discharge of grease along the front portion of the guard, said guard and reservoir being relatively movable by pressure of the body of the animal, whereby a discharge of grease may be facilitated.

In testimony whereof I affix my signature in the presence of two witnesses.

WILLIAM D. JAMES.

Witnesses:
ROBT. F. PARKS,
JOHN G. SHODRON.